(12) United States Patent
Ma

(10) Patent No.: US 11,802,769 B2
(45) Date of Patent: Oct. 31, 2023

(54) LANE LINE POSITIONING METHOD AND APPARATUS, AND STORAGE MEDIUM THEREOF

(71) Applicant: TENCENT TECHNOLOGY (SHENZHEN) COMPANY LIMITED, Shenzhen (CN)

(72) Inventor: Yanhai Ma, Shenzhen (CN)

(73) Assignee: Tencent Technology (Shenzhen) Company Limited, Guangdong (CN)

( * ) Notice: Subject to any disclaimer, the term of this patent is extended or adjusted under 35 U.S.C. 154(b) by 562 days.

(21) Appl. No.: 17/061,004

(22) Filed: Oct. 1, 2020

(65) Prior Publication Data

US 2021/0025713 A1    Jan. 28, 2021

Related U.S. Application Data

(63) Continuation of application No. PCT/CN2019/100905, filed on Aug. 16, 2019.

(30) Foreign Application Priority Data

Aug. 20, 2018   (CN) .......................... 201810949717.9

(51) Int. Cl.
  *G06V 20/58* (2022.01)
  *G01C 21/16* (2006.01)
  (Continued)

(52) U.S. Cl.
  CPC ..... *G01C 21/1656* (2020.08); *G01C 21/3822* (2020.08); *G06T 3/0006* (2013.01);
  (Continued)

(58) Field of Classification Search
  CPC ............ G01C 21/1656; G01C 21/3822; G01C 21/16; G06T 3/0006; G06T 7/70; G06T 2207/30256; G06V 20/588
  See application file for complete search history.

(56) References Cited

U.S. PATENT DOCUMENTS

2017/0369057 A1* 12/2017 Gurghian .............. B60W 30/12
2018/0188059 A1   7/2018 Wheeler et al.

FOREIGN PATENT DOCUMENTS

| CN | 101183008 | 8/2008 |
|----|-----------|--------|
| CN | 203772282 | 8/2014 |

(Continued)

OTHER PUBLICATIONS

International Search Report issued in International Application No. PCT/CN2019/100905 dated Aug. 16, 2019.

(Continued)

*Primary Examiner* — Kenneth J Malkowski
(74) *Attorney, Agent, or Firm* — Crowell & Moring, LLP

(57) ABSTRACT

This disclosure is directed to a lane line positioning method and apparatus. The method includes obtaining inertial information, target traveling information, and first position information of a vehicle. The inertial information comprises information measured by an inertial measurement unit of the vehicle. The target traveling information comprises traveling information of the vehicle acquired at a first moment. The first position information comprises a position of the vehicle at the first moment. The method includes determining second position information according to the target traveling information and the first position information and determining third position information of the vehicle at a second moment based on the inertial information of the vehicle and the second position information. The method includes determining a position of a lane line in a map according to the third position information and relative position information.

20 Claims, 6 Drawing Sheets

(51) Int. Cl.
*G06T 7/70* (2017.01)
*G01C 21/00* (2006.01)
*G06T 3/00* (2006.01)
*G06V 20/56* (2022.01)

(52) U.S. Cl.
CPC .............. *G06T 7/70* (2017.01); *G06V 20/588* (2022.01); *G06T 2207/30256* (2013.01)

(56) References Cited

FOREIGN PATENT DOCUMENTS

| | | |
|---|---|---|
| CN | 106289275 | 1/2017 |
| CN | 106525057 | 3/2017 |

OTHER PUBLICATIONS

Sukkarieh, Salah, "Low Cost, High Integrity, Aided Inertial Navigation Systems for Autonomous Land Vehicles", A thesis submitted in fulfillment of the requirement for the degree of Doctor of Philosophy, Australian Centre for Field Robotics, Department of Mechanical and Mechatronic Engineering, The University of Sydney, Mar. 2000, 212 pages.

Scherzinger, Bruno, "Precise Robust Positioning With Inertially Aided RTK", Applanix Corporation, Revised Jul. 2006, 11 pages.

Extended European Search Report issued in European application 19851366.5 dated Dec. 14, 2021, 14 pages.

\* cited by examiner

Lane line detection

Affine transformation

LANE LINE POSITIONING METHOD AND APPARATUS, AND STORAGE MEDIUM THEREOF

RELATED APPLICATION

This application is a continuation application of PCT Patent Application No. PCT/CN2019/100905, filed on Aug. 16, 2019, which claims priority to Chinese Patent Application No. 201810949717.9, filed with the National Intellectual Property Administration, PRC on Aug. 20, 2018 and entitled "LANE LINE POSITIONING METHOD AND APPARATUS, STORAGE MEDIUM, AND ELECTRONIC DEVICE", wherein the content of each of the above-referenced applications is incorporated herein by reference in its entirety.

FIELD OF THE TECHNOLOGY

This application relates to the field of maps, and in particular, to lane line positioning technologies.

BACKGROUND OF THE DISCLOSURE

Digital maps are generally road maps in form, the scope of the digital maps is often limited to outdoor roadways, and the precision of the digital maps is mostly at a road level. An amount of information that can be provided is extremely limited, can only be used for outdoor navigation and inaccurate positioning, has a limited driving assistance effect on a driver, and cannot meet requirements of a vehicle for accurate positioning and navigation, for example, a lane line level required for automatic driving and even more accurate positioning requirements.

Expression forms of many pieces of existing map data can only function as an identifications of the map, are not closely enough associated with actual vehicle applications, and have difficulty in adapting to a future development direction of vehicles such as driving assistance and unmanned driving. Therefore, a high-precision map needs to be created, a high-precision map needs to be created. A method for creating a lane line in the high-precision map in the related art mostly relies on manual surveying and mapping and manual processing, has the following main defects:

1) A positioning means used in a surveying process often relies on the Global Positioning System (GPS), to provide an accurate positioning result. Because of a limitation of a communication distance to a base station, the positioning means can be applied only within a specific range near the base station, and an environment needs to be a scenario, such as the open air, where obtaining of a GPS signal is not affected. Map creation of a closed or semi-closed scenario such as an indoor parking place is limited by the GPS-based positioning means. Because no GPS signal exists (an identifier, such as a lane line, cannot be accurately positioned) or a GPS signal is weak (a relatively large deviation exists in a measured positioning result), a solution of creating a lane line in a map based on a GPS positioning mode is not feasible. Consequently, a drawn lane line has a relatively large deviation or a lane line cannot be drawn at all, and high-efficiency and low-cost map creation cannot be implemented.

2) Because operations of the manual surveying and mapping are complex and are likely to have errors, and manual correction efficiency is low, it is difficult to applying the manual surveying and mapping to creation of large-scale and a city-level quantity of maps. For the foregoing problems, no effective solution has been provided yet.

SUMMARY

Embodiments of this disclosure provide a lane line positioning method and apparatus, a storage medium, and an electronic device, to resolve at least the technical problem in the related art that a position of a lane line in a map cannot be accurately determined.

According to an aspect of the embodiments of this disclosure, a lane line positioning method is provided. The method may include obtaining inertial information, target traveling information, and first position information of a vehicle. The inertial information may include information measured by an inertial measurement unit of the vehicle. The target traveling information may include traveling information of the vehicle acquired at a first moment. The first position information may include a position of the vehicle at the first moment. The method may further include determining second position information according to the target traveling information and the first position information. The method may further include determining third position information of the vehicle at a second moment based on the inertial information of the vehicle and the second position information. The second moment is later than the first moment. The method may further include determining a position of a lane line in a map according to the third position information and relative position information. The relative position information may indicate a relative position between a detected lane line and the vehicle.

According to another aspect of the embodiments of this disclosure, a lane line positioning apparatus is provided. The apparatus may include a memory operable to store program code and a processor operable to read the program code. The processor may be configured to obtain inertial information, target traveling information, and first position information of a vehicle. The inertial information may include information measured by an inertial measurement unit of the vehicle. The target traveling information may include traveling information of the vehicle acquired at a first moment. The first position information may include a position of the vehicle at the first moment. The processor may be further configured to determine second position information according to the target traveling information and the first position information. The processor may be further configured to determine third position information of the vehicle at a second moment based on the inertial information of the vehicle and the second position information. The second moment is later than the first moment. The processor is configured to determine a position of a lane line in a map according to the third position information and relative position information, the relative position information indicating a relative position between a detected lane line and the vehicle.

According to another aspect of the embodiments of this disclosure, a non-transitory machine-readable storage medium is provided. The storage medium may have processor executable instructions stored thereon for causing a processor to obtain inertial information, target traveling information, and first position information of a vehicle. The inertial information may include information measured by an inertial measurement unit of the vehicle. The target traveling information may include traveling information of the vehicle acquired at a first moment. The first position information may include a position of the vehicle at the first moment. The instructions may further cause the processor to determine second position information according to the target traveling information and the first position information. The instructions may further cause the processor to determine third position information of the vehicle at a second moment based on the inertial information of the vehicle and the second position information. The second moment is later than the first moment. The instructions may further cause the processor to determine a position of a lane line in a map according to the third position information and relative position information. The relative position information may indicate a relative position between a detected lane line and the vehicle.

In this embodiment of this disclosure, the inertial information, the target traveling information, and the first position information of the vehicle are obtained. The inertial information is the information measured by the inertial measurement unit of the vehicle, the target traveling information is the traveling information of the vehicle acquired at the first moment, and the first position information may include the position of the vehicle at the first moment. The second position information is determined according to the target traveling information and the first position information, and the third position information of the vehicle at a second moment is determined based on the inertial information and the second position information of the vehicle. The second moment is later than the first moment. The position of the lane line in the map is determined according to the third position information and the relative position information. The relative position information is used for indicating the relative position between the lane line detected by the vehicle and the vehicle. Because the inertial information does not rely on a GPS signal, even in a case that there is no GPS signal, the third position information of the vehicle at a later moment (that is, the second moment) may be determined by using the second position information and the inertial information of the vehicle, and then the position of the lane line in the map is determined according to the third position information and the relative position between the lane line and the vehicle, to resolve the technical problem in the related art that the position of the lane line in the map cannot be accurately determined, and further achieve a technical effect of accurately positioning the lane line.

BRIEF DESCRIPTION OF THE DRAWINGS

The accompanying drawings described herein are used for providing further understanding of this disclosure, and form a part of this disclosure. Exemplary embodiments of this disclosure and descriptions thereof are used for explaining this disclosure, and do not constitute any inappropriate limitation to this disclosure. In the accompanying drawings.

DESCRIPTION OF EMBODIMENTS

Figure 1:
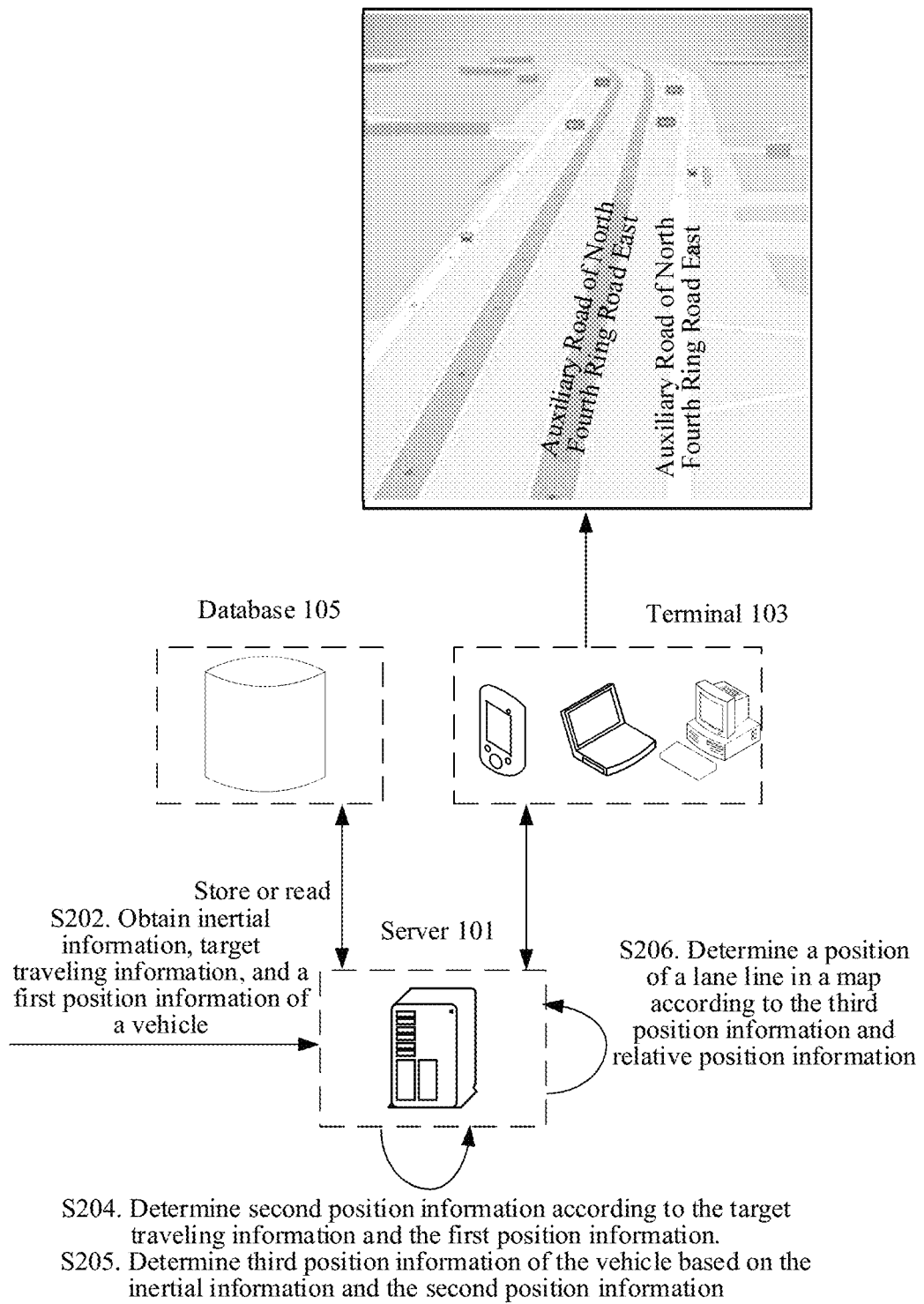
FIG. 1 is a schematic diagram of a hardware environment of a lane line positioning method according to an embodiment of this disclosure.

To make a person skilled in the art better understand solutions of this disclosure, the following clearly and completely describes the technical solutions in the embodiments of this disclosure with reference to the accompanying drawings in the embodiments of this disclosure. Apparently, the described embodiments are merely some rather than all of the embodiments of this disclosure. All other embodiments obtained by a person of ordinary skill in the art based on the embodiments of this disclosure without creative efforts shall fall within the protection scope of this disclosure.

The terms such as "first" and "second" in the specification, the claims and the accompanying drawings of this disclosure are intended to distinguish between similar objects, but are not necessarily used for describing a specific sequence or a precedence level. The data termed in such a way are interchangeable in proper circumstances, so that the embodiments of this disclosure described herein can be implemented in orders except the order illustrated or described herein. In addition, the terms "include", "have", and any other variants are intended to cover the non-exclusive inclusion. For example, a process, method, system, product, or device that includes a series of steps or units is not necessarily limited to those steps or units, but may include other steps or units not expressly listed or inherent to such a process, method, product, or device.

First, some nouns or terms that appear during descriptions of the embodiments of this disclosure are applicable to the following explanations:

An autonomous vehicle or a self-piloting automobile, also referred to as a self-driving automobile, a computer-driven automobile, or a wheeled mobile robot, is an intelligent automobile that implements unmanned driving by using a computer system.

A high-precision map refers to a map having high precision and precise definitions, and lanes can only be distinguished when precision of the high-precision map reaches a decimeter level. Nowadays, with the development of positioning technologies, high-precision positioning has become possible. Moreover, for the precise definitions, various traffic elements in a traffic scene, including data, such as road network data, lane network data, lane lines, and traffic signs, in a conventional map, need to be stored in a formatted manner.

Simultaneous localization and mapping (SLAM) is also referred to as concurrent mapping and localization (CML).

A micro-electro-mechanical system (MEMS), also referred to as a micro electromechanical system, a micro system, a micro machine, or the like, refers to a high-tech apparatus having a size of a few millimeters or even a smaller size. An internal structure of the MEMS is generally at a micron or even a nanometer level and is an independent intelligent system.

An inertial measurement unit (IMU) is an apparatus configured to measure triaxial attitudes (or angular velocities) and accelerations of an object.

According to an aspect of the embodiments of this disclosure, a method embodiment of a lane line positioning method is provided.

Optionally, in this embodiment, the foregoing lane line positioning method may be applied to a hardware environment, as shown in FIG. 1, including a server 101 and/or a terminal 103. As shown in FIG. 1, the server 101, connected to the terminal 103 through a network, can be configured to provide a service (such as a game service, an application service, or a map service) for the terminal or a client installed on the terminal. A database 105 may be disposed on the server 101 or independently of the server 101, and is configured to provide a data storage service for the server 101. The foregoing network includes, but is not limited to, a wide area network, a metropolitan area network, or a local area network. The terminal 103 is an intelligent terminal that can be used on a vehicle, and is not limited to an in-vehicle device, a mobile phone, a tablet computer, or the like.

Figure 2:
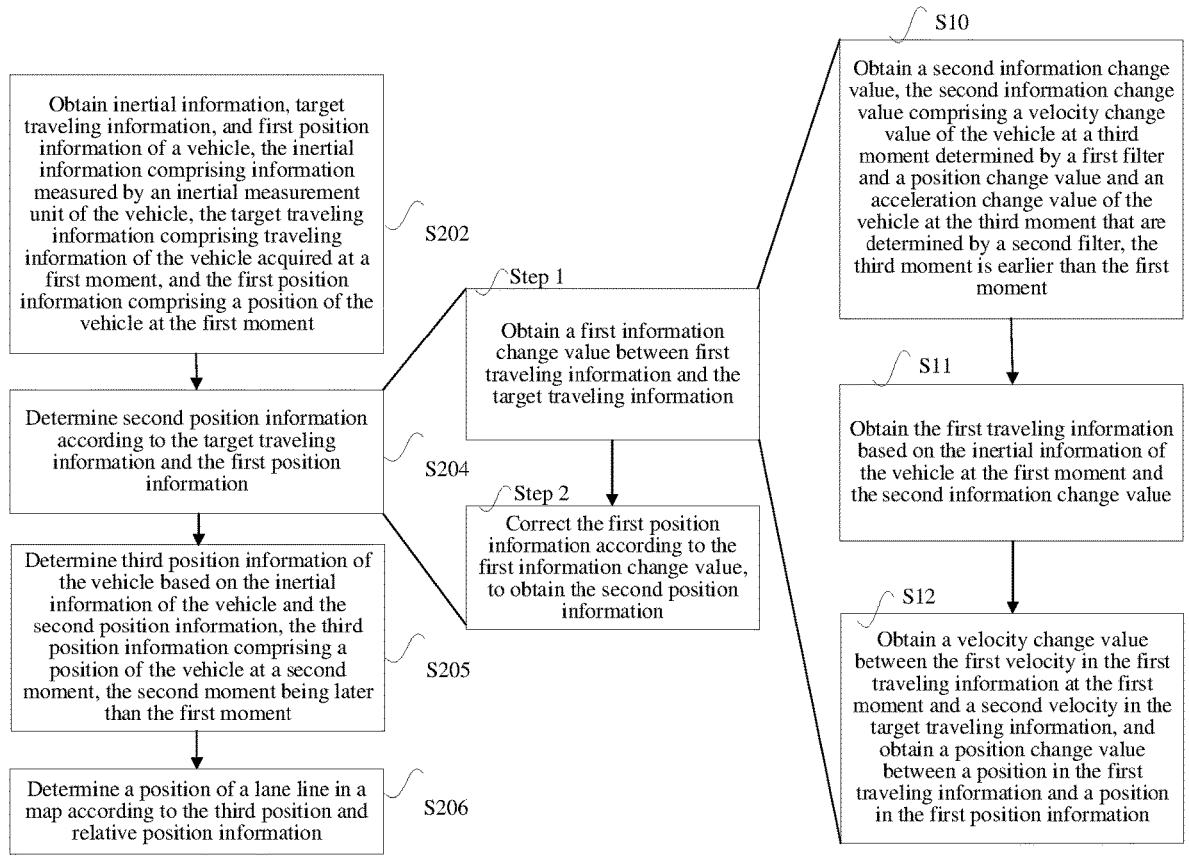
FIG. 2 is a flowchart of an optional lane line positioning method according to an embodiment of this disclosure.

The lane line positioning method in this embodiment of this disclosure may be performed by the server 101. FIG. 2 is a flowchart of an optional lane line positioning method according to an embodiment of this disclosure. As shown in FIG. 2, the method may include the following steps.

Step S202. The server obtains inertial information, target traveling information, and first position information of a vehicle.

The inertial information is information measured by an IMU of the vehicle, the target traveling information is traveling information of the vehicle acquired at a first moment, and the first position information is a position of the vehicle at the first moment.

The foregoing inertial information is the information measured by the IMU of the vehicle, for example, information measured by an IMU including three uniaxial accelerometers and three uniaxial gyroscopes. The information may include acceleration information of an object, measured by the accelerometers, in independent three axes of a vehicle coordinate system, and angular velocity information of the vehicle, measured by the gyroscopes, relative to a navigation coordinate system.

The foregoing target traveling information is information generated or measured during traveling of the vehicle, for example, one or more of mileage information, velocity information, acceleration information, and positioning information. In a case that the vehicle is in a closed or semi-closed scenario such as a bridge hole, a cave, or a parking place, the traveling information does not include positioning information such as GPS information.

Step S204. The server determines second position information according to the target traveling information and the first position information. Step S205. The server determines third position information of the vehicle at a second moment based on the inertial information of the vehicle and the second position information.

The second moment is later than the first moment. The vehicle may predict the third position information of the vehicle at the second moment after the first moment according to the inertial information, the target traveling information, and the foregoing first position information at the first moment of the vehicle.

In some cases, there is a relatively high real-time requirement for lane line positioning, but traveling information (for example, a position outputted by an odometer of the vehicle) outputted by a relevant instrument of the vehicle cannot meet the real-time requirement, for example, the real-time requirement is outputting a position every 0.01 seconds, but the odometer updates the position every 2 seconds. Therefore, target traveling information outputted by the instrument of the vehicle cannot be directly used, and instead, first position information (for example, the first position information is updated every 0.01 seconds) is estimated in real time according to the real-time requirement during vehicle traveling. In this case, to further ensure accuracy of the first position information, and further ensure accuracy of lane line positioning, when the relevant instrument of the vehicle has the outputted target traveling information, an implementation in which the server determines the second position information according to the target traveling information and the first position information may be: correcting first position information estimated at a current moment by using the target traveling information, to avoid an error caused by estimation performed between a previous correction and the current correction (equivalent to a cycle) from entering a next cycle between the current correction and a next correction, so that a subsequently predicted position is more accurate, in other words, the lane line can be positioned more accurately.

To ensure integrity of the lane line positioning solution, when the relevant instrument of the vehicle does have (or does not update) outputted target traveling information, the first position information may be directly used as the second position information in step S205, to determine third position information of the vehicle at the second moment based on the inertial information of the vehicle and the second position information.

Step S206. The server determines a position of a lane line in a map according to the third position information and relative position information.

The relative position information is used for indicating a relative position between a detected lane line and the vehicle. In other words, a position of the vehicle in the map may be determined according to the third position information, the position of the lane line in the map may be further determined according to the relative position, and the lane line may be further created at the position. In this solution, the third position information of the vehicle may be determined based on the inertial information and the target traveling information of the vehicle, and then, the position of the lane line in the map is determined according to the third position information and the relative position between the lane line and the vehicle without relying on a GPS signal. Even if there is no GPS signal, the lane line positioning is still performed by using the inertial information of the vehicle.

In the foregoing embodiment, descriptions are made by using an example in which the lane line positioning method in this embodiment of this disclosure is performed by the server 101. Optionally, the lane line positioning method in this embodiment of this disclosure may alternatively be performed by the terminal 103, and differs from the foregoing embodiment in that, an execution body is changed from the server 101 to the terminal 103. The lane line positioning method in this embodiment of this disclosure may alternatively be performed by the server 101 and the terminal 103 together, one or two of step S202 to step S206 are performed by the server 101, and remaining steps are performed by the terminal 103. The lane line positioning method in this embodiment of this disclosure performed by the terminal 103 may alternatively be performed by a client (for example, a client of a map creation application) installed on the terminal.

Through the foregoing steps S202 to step S206, to further ensure accuracy of lane line positioning, the estimated first position information of the vehicle at a certain moment (that is, the first moment) is corrected based on the target traveling information of the vehicle, to obtain the actual second position information, the third position information of the vehicle at a later moment (that is, the second moment) is further determined by using the second position information and the inertial information of the vehicle, and then the position of the lane line in the map is determined according to the third position information and the relative position between the lane line and the vehicle, to resolve the technical problem in the related art that the position of the lane line in the map cannot be accurately determined, and further achieve a technical effect of accurately positioning the lane line.

The technical solution of this disclosure may be applied to a high-precision map, and the lane line is very important map information in the high-precision map. In the technical solution of this disclosure, mapping of a high-precision lane line map can be implemented based on the visual SLAM of a low-cost MEMS IMU. The technical solution of this disclosure is further described below in detail with reference to steps shown in FIG. 2.

In the technical solution provided in step S202, the server obtains the inertial information, the target traveling information, and the first position information of the vehicle. The inertial information is the information measured by the inertial measurement unit of the vehicle, the target traveling information is the traveling information of the vehicle acquired at the first moment, and the first position information may include the position of the vehicle at the first moment.

Using an IMU including three uniaxial accelerometers and three uniaxial gyroscopes as an example, the obtaining inertial information, target traveling information, and first position information of a vehicle includes the following two cases:

When a positioning signal (such as a GPS positioning signal or a Beidou positioning signal) exists, the obtained information includes: accelerations measured by the accelerometers in three axis directions, angular velocities measured by the gyroscopes in three axis directions, a velocity measured by the odometer, a position and an acceleration obtained through positioning, and the first position information.

When there is no positioning signal (for example, in a closed or semi-closed scenario such as a parking place, a bridge hole, or a cave), the obtained information includes: accelerations measured by the accelerometers in three axis directions, angular velocities measured by the gyroscopes in three axis directions, a velocity measured by the odometer, and the first position information.

In the technical solution provided in steps S204 and S205, if the server corrects the first position information by using the target traveling information, to obtain second position information, and determines third position information of the vehicle at the second moment based on the inertial information of the vehicle and the second position information, the second moment is later than the first moment. In other words, the vehicle may predict the position of the vehicle at the second moment after the first moment according to the inertial information, the target traveling information, and the foregoing first position information at the first moment of the vehicle. If an SLAM frontend filters information of the MEMS IMU, an automobile wheel speed, and differential GPS information by using a Kalman filter, to implement the function of the odometer, and an SLAM backend completes a closed loop by using differential GPS data, performs optimization by using a pose graph, to eliminate accumulated errors of a trajectory of a frontend odometer.

In the foregoing embodiment, the correcting the first position information by using the target traveling information, to obtain the second position information, and determining the third position information of the vehicle at the second moment based on the inertial information of the vehicle and the second position information may include step 1 and step 2 shown in the following.

Step 1. Obtain a first information change value between first traveling information and the target traveling information.

The traveling information includes the first traveling information and the target traveling information. The first traveling information is determined according to inertial information of the vehicle at the first moment, and the first information change value is a traveling information change value of the vehicle at the first moment.

Optionally, the obtaining a first information change value between first traveling information and the target traveling information may include step 11 and step 12 shown in the following.

Step 11. Obtain the first traveling information outputted by a strapdown inertial navigation calculation module according to the inertial information of the vehicle at the first moment and a second information change value, and obtain the target traveling information.

The strapdown inertial navigation calculation module may determine the acceleration of the vehicle by using multiaxial angular velocities (an acceleration direction) and multiaxial accelerations (an acceleration magnitude) at the second moment, correct, by using a velocity change value at the first moment, the velocity at the first moment calculated by an INS, to obtain an actual velocity, and calculate an advanced mileage (vt+at2/2) in a time period t by using the actual velocity v and the acceleration a, that is, determine the third position information.

In this embodiment, the first traveling information includes a first velocity, an acceleration, and the first position information of the vehicle at the first moment outputted by the strapdown inertial navigation calculation module, the second information change value is a traveling information change value of the vehicle at a third moment, and the third moment is earlier than the first moment.

Optionally, before the obtaining the first driving information outputted by the strapdown inertial navigation calculation module according to the inertial information of the vehicle at the first moment and a second information change value, the second information change value is obtained at step 10. The second information change value includes a velocity change value of the vehicle at the third moment determined by using a first filter and a position change value and an acceleration change value at the third moment that are determined by using a second filter. The third moment is earlier than the first moment.

Step 12. Obtain a velocity change value between the first velocity in the first traveling information at the first moment and a second velocity in the target traveling information, and a position change value between a position in the first traveling information and a position in the first position information in a case that the vehicle is not communicably connected to a positioning system.

The first information change value include a velocity change value at the first moment and a position change value at the first moment.

In this embodiment, the obtaining the target traveling information of the vehicle acquired at the first moment in a case that the vehicle is not communicably connected to a positioning system may include: obtaining a second velocity of the vehicle determined by the odometer of the vehicle at the first moment and the position of the vehicle at the first moment.

The obtaining the target traveling information of the vehicle acquired at the first moment in a case that the vehicle is communicably connected to the positioning system may include: obtaining the position of the vehicle at the first moment determined by the positioning system and the acceleration at the first moment; and obtaining a second velocity of the vehicle determined by the odometer of the vehicle at the first moment and the position of the vehicle at the first moment.

Step 2. Correct the first position information according to the first information change value, to obtain the second position information, and determine the third position information by using the second position information and the inertial information of the vehicle at the second moment.

Optionally, in a case that the inertial information of the vehicle at the second moment includes multiaxial angular velocities at the second moment and multiaxial accelerations at the second moment, and the first information change value includes a velocity change value at the first moment and a position change value at the first moment, the correcting the first position information according to the first information change value, to obtain the second position information, and determining the third position information by using the second position information and the inertial information of the vehicle at the second moment includes: using the multiaxial angular velocities of the vehicle at the second moment, the multiaxial accelerations at the second moment, and the first information change value as inputs of a strapdown inertial navigation calculation module, the strapdown inertial navigation calculation module being configured to: correct the first position information by using the position change value at the first moment, to obtain the second position information, correct a velocity at the first moment by using the velocity change value at the first moment, determine an acceleration of the vehicle at the second moment by using the multiaxial angular velocities at the second moment and the multiaxial accelerations at the second moment, and determine the third position information by using the acceleration of the vehicle at the second moment, the second position information, and the corrected velocity at the first moment; and obtaining the third position information of the vehicle at the second moment outputted by the strapdown inertial navigation calculation module.

Figure 3:
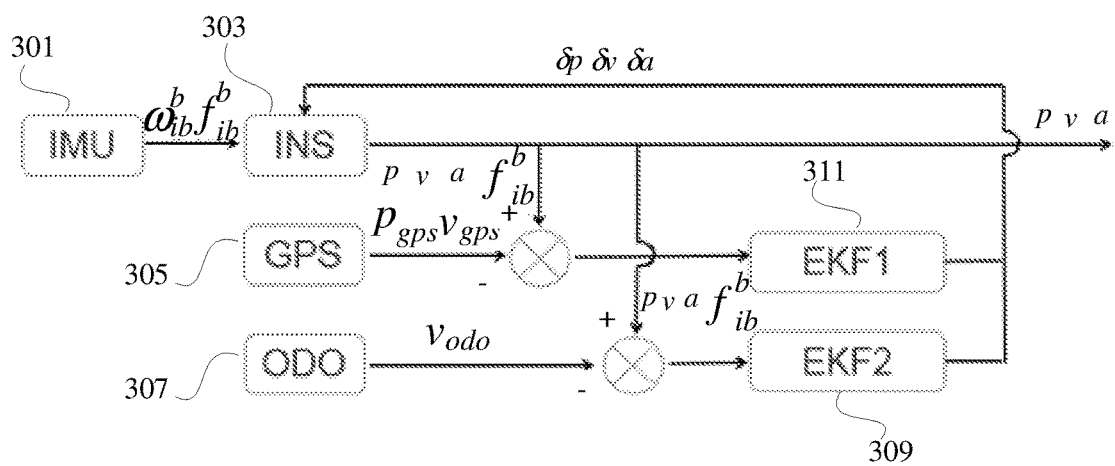
FIG. 3 is a schematic diagram of an optional strapdown inertial navigation calculation module according to an embodiment of this disclosure.

Referring to FIG. 3, the embodiment shown in steps S204 and S205 may include the following three stages (in which t0 is earlier than t1, and t2 is later than t1):

In a stage 1, that is, the stage t0, the IMU 301 outputs triaxial angular velocities $\omega_{ib}^b$ and triaxial accelerations $f_{ib}^b$ at the current moment (equivalent to inertial information at the third moment), and the INS 303 outputs a position p, a velocity v, and an acceleration a at the current moment according to $\omega_{ib}^b$ and $f_{ib}^b$ outputted by the IMU 301, while the GPS 305 outputs a position $p_{gps}$ and a velocity $v_{gps}$ obtained through positioning into an EKF1 311 for filtering, that is, for comparison with outputs of the INS 303. Correspondingly, a velocity $v_{odo}$ outputted by the odometer enters an EKF2 309 for filtering. The two filters separately output a position error δp, a velocity error δv, and an attitude error δa estimated through filtering to the INS 303 (equivalent to the second information change value at the third moment), to correct errors of the INS 303.

In a stage 2, that is, the stage t1, the IMU 301 outputs triaxial angular velocities $\omega_{ib}^b$ and triaxial accelerations $f_{ib}^b$ at the current moment (equivalent to inertial information at the first moment), and the INS 303 outputs a position p, a velocity v, and an acceleration a (that is, the first traveling information) at the current moment according to $\omega_{ib}^b$ and $f_{ib}^b$ outputted by the IMU 301, and a position error δp, a velocity error δv, and an attitude error δa (that is, the second information change value) obtained at a previous moment, while the GPS 305 outputs a position $p_{gps}$ and a velocity $v_{gps}$ obtained through positioning into the EKF1 311 for filtering, that is, comparison with outputs of the INS 303. Correspondingly, a velocity $v_{odo}$ outputted by the odometer enters the EKF2 309 for filtering. The two filters separately output a position error δp, a velocity error δv, and an attitude error δa (equivalent to the first information change value at the first moment) estimated through filtering to the INS 303, to correct errors of the INS 303.

In a stage 3, that is, the stage t2, the IMU 301 outputs triaxial angular velocities $\omega_{ib}^b$ and triaxial accelerations $f_{ib}^b$ at the current moment (equivalent to inertial information at the second moment), and the INS 303 outputs a position p, a velocity v, and an acceleration a at the current moment according to $\omega_{ib}^b$ and $f_{ib}^b$ outputted by the IMU 301, a position error δp, a velocity error δv, and an attitude error δa (that is, the first information change value) obtained at a previous moment, while a velocity $v_{odo}$ outputted by the odometer enters the EKF2 309 for filtering. The filter outputs a velocity error δv estimated through filtering to the INS 303 (equivalent to the information change value at the second moment), to correct errors of the INS 303 at a next moment.

The foregoing step 1 and step 2 may be performed cyclically. In one cycle, after step 1 and step 2, first position information at a later moment may be determined according to third position information at a specific time. In a next (step 1 and step 2) cycle, the third position information may be used as a new first position information. A most initial first position information may be a position obtained by positioning when GPS signals are good. The above is equivalent to that in the technical solution of this disclosure, a position at which the vehicle is located when subsequently, GPS signals are poor by using a positioning result when the GPS signals are good and with reference to inertial navigation.

In the technical solution provided in step S206, the server determines a position of a lane line in a map according to the third position information and relative position information. The relative position information is used for indicating a relative position between a detected lane line and the vehicle. In other words, a position of the vehicle in the map may be determined according to the third position information, the position of the lane line in the map may be further determined according to the relative position indicated by the relative position information, and the lane line may be further created at the position. For example, a relative spatial distance (relative position information) of a lane line of a road relative to the vehicle may be obtained by performing lane line detection, affine transformation, and spatial measurement on an image of a monocular camera, and the distance is converted into a space point of a lane line as a landmark, serving as a local map.

Optionally, the determining a position of a lane line in a map according to the third position information and relative position information may include step 1 to step 3.

Step 1. Recognize a lane line from a target image acquired by the image acquisition apparatus of the vehicle.

Optionally, when the lane line is recognized from the target image acquired by the image acquisition apparatus of the vehicle, affine transformation may be performed on the target image by using an affine transformation matrix, to obtain an affine transformation graph of the target image, and a parallel line in the affine transformation graph is used as the lane line.

An optional affine transformation matrix is shown as follows:

$$\begin{bmatrix} u_d \\ v_d \\ 1 \end{bmatrix} = \begin{bmatrix} m_{00} & m_{01} & m_{02} \\ m_{10} & m_{11} & m_{12} \\ m_{20} & m_{21} & m_{22} \end{bmatrix} \begin{bmatrix} u_s \\ v_s \\ 1 \end{bmatrix}$$

where $u_d$ and $v_d$ represent two-dimensional coordinates of target points after transformation in a first coordinate system respectively, $u_s$ and $v_s$ represent two-dimensional coordinates of target points before the transformation in a second coordinate system respectively, and $$\begin{bmatrix} m_{00} & m_{01} & m_{02} \\ m_{10} & m_{11} & m_{12} \\ m_{20} & m_{21} & m_{22} \end{bmatrix}$$

represents a matrix in which points in the second coordinate system are mapped to the first coordinate system, where $m_{00}$ to $m_{22}$ are transformation parameters.

Step 2. Obtain relative position information between the lane line and the vehicle.

Optionally, if the relative position information includes a relative distance between the lane line and the vehicle, when the relative position information between the lane line and the vehicle is obtained, a pixel distance between the lane line and the vehicle in the affine transformation graph may be obtained. The relative distance between the lane line and the vehicle is determined by using a product between a scale factor (or referred to as a scaling factor, that is, a ratio between an object size in the map and an actual size of the object) of the affine transformation and the pixel distance. For example, the relative distance may be a distance*a distance represented by a single pixel*a contractible multiple.

Step 3. Search for fourth position information to which the third position information is mapped in the map. Step 4. Determine a fifth position information in the map according to the fourth position information and the relative position information, and create a lane line at the fifth position information.

For example, the relative position information includes a relative distance. In an actual scenario, if a relative distance between the lane line and the vehicle is Y, and a scaling ratio of the map is 1/X, a relative distance between the lane line and the vehicle in the map is Y/X, and in addition, a position relationship between the lane line and the vehicle is the same as that in the actual scenario.

In an optional embodiment, the following describes the technical solution of this disclosure in detail by using an example that the technical solution of this disclosure is applied to a high-precision map.

In the related technical solution, drawing of the lane line in the high-precision map includes the following two technical solutions: A first technical solution is to obtain a vehicle traveling trajectory based on high-precision inertial navigation and a differential GPS, perform lane line detection and relative position extraction based on a laser radar and a camera, and finally fuse a vehicle traveling pose and the relative position information of the lane line to obtain a high-precision map. The second technical solution is to implement automatic extraction of the lane line high-precision map based on the visual SLAM/laser SLAM. There may be a plurality of methods for implementing pure visual SLAM. One is a feature point-based method, and the other is to implement a frontend based on an optical flow method, and implement a backend generally by using a graph optimization method. A laser-based SLAM method is a point-line-plane matching mode usually adopted by the frontend, and the backend generally adopts the graph optimization method.

There are following disadvantages in the foregoing first technical solution: In scenarios such as a shelter and a tunnel, because GPS information is not available, poor trajectory precision is caused if situations are complex, for example, an underground garage and a tunnel are relatively long or there is an internal turning, the established high-precision map cannot be used in this case, and costs of using the high-precision inertial navigation and a surveying and mapping-level laser radar are extremely high. In addition, the solution is only applicable to off-line mapping, and is inapplicable to on-line mapping.

There are following disadvantages in the foregoing second technical solution: When frontend calculation is performed based on the visual SLAM and the laser SLAM, the frontend calculation is greatly affected by an environment. The effects mainly include: a light change effect on the visual SLAM, resulting in that effective feature points cannot be extracted or feature point tracking fails, and in addition, relatively large effects of dynamic environments, such as a vehicle and a pedestrian traveling on the road, on the visual SLAM and the laser SLAM, resulting in that the SLAM calculation frontend is unstable. In addition, the environment effect on the visual SLAM may cause errors of closed-loop detection, the laser SLAM generally cannot implement loop-back detection by relying on only point cloud information, and cannot perform closed-loop optimization, and therefore, backend loop-back of the two methods is unstable.

In this solution of this applicant, the SLAM frontend filters data of the low-cost MEMS IMU, wheel speed data, and RTK GPS data by using double EKFs, to correct strapdown calculation errors of the IMU. Because the strapdown calculation is an autonomous calculation, and is subjected to extremely small impact of an external environment because the wheel speed data is data of the vehicle, stable frontend odometer estimation can be implemented. In addition, for extraction of a local lane line map on the frontend, stable local map information can be obtained through lane line detection, affine transformation, calibration, and the like, and there is extremely small external interference.

In addition, during backend processing, the RTK GPS data is used for loop-back detection, to, on the one hand, ensure loop-back precision, and on the other hand, ensure stability. Therefore, this solution has advantages of low costs, high precision, and automated on-line mapping of a high-precision lane line map.

Referring to FIG. 3, this solution mainly includes three parts.

(1) Odometer of a SLAM Frontend

As shown in FIG. 3, an IMU device outputs the triaxial angular velocities $\omega_{ib}^b$ measured by the gyroscopes and the triaxial accelerations $f_{ib}^b$ measured by the accelerometers, and $\omega_{ib}^b$ and $f_{ib}^b$ enter the strapdown calculation module INS (or referred to as the strapdown inertial navigation calculation module) to calculate the position p, the velocity v, and the attitude a. Whenever the GPS signal is normal, a difference between the position p obtained through strapdown calculation and the position of the GPS and a difference between the velocity v obtained through the strapdown calculation and the velocity $v_{gps}$ of the GPS are used as observed variables and enter the EKF1 (a Kalman filter) for filtering, and a position error δp, a velocity error δv, and an attitude error δa (an attitude is an orientation, and can be represented by an acceleration direction, in other words, the attitude error is an error of the acceleration direction) estimated through filtering are fed back to the strapdown calculation module for error correction. When there is output information about a vehicle wheel speed, a difference between v outputted by the strapdown calculation at the current moment and wheel speed information $v_{odo}$ is used as an observed variable and is transmitted to the EKF2 filter (another Kalman filter) for filtering estimation on the INS calculation error, and a position error δp, a velocity error δv, and an attitude error δa obtained through EKF2 estimation are fed back to the strapdown calculation module for correcting outputs of the strapdown calculation, to obtain attitude information stably outputted after the correction.

In the foregoing solution, the reason why an integrated filtering result is used as an odometer is that the GPS signal is not always available. For example, the GPS signal is out of lock in a relatively long time in scenarios such as a toll station, a platform bridge, a tunnel, and an underground garage, and recursion can be performed only by relying on the strapdown calculation and the vehicle velocity data as the odometer.

(2) Local Lane Line Mapping of the SLAM Front-End

To enable automated mapping, information about the relative distance between the lane line and the vehicle may be obtained in real time.

Step 1. Perform lane line detection on data, such as a target image, acquired by a monocular camera, where a lane line may be detected by relying on deep learning or an image processing method.

An example in which the lane line is detected through the deep learning is used. Several images including a lane line may be obtained in advance, and the lane line is marked in the images. A deep learning model is trained by using the marked images, and the trained model has a capability of recognizing a lane line. That is, the target image acquired by the image acquisition apparatus of the vehicle, such as the monocular camera, is inputted to the module, and the model can automatically recognize a lane line in the target image.

Step 2. Perform affine transformation on the image according to a four-point method, and search the target image outputted by the monocular camera for four points s1, s2, s3, and s4 of parallel line segments. Corresponding four points d1, d2, d3, and d4 are set on the affine map. An affine matrix is obtained according to an affine transformation formula as follows:

$$\begin{bmatrix} u_d \\ v_d \\ 1 \end{bmatrix} = \begin{bmatrix} m_{00} & m_{01} & m_{02} \\ m_{10} & m_{11} & m_{12} \\ m_{20} & m_{21} & m_{22} \end{bmatrix} \begin{bmatrix} u_s \\ v_s \\ 1 \end{bmatrix} \text{ where } \begin{bmatrix} m_{00} & m_{01} & m_{02} \\ m_{10} & m_{11} & m_{12} \\ m_{20} & m_{21} & m_{22} \end{bmatrix}$$

is recorded as a transformation matrix M, since coordinates of s1 . . . and s4, as well as d1 . . . and d4 are known in advance, an affine transformation matrix M may be obtained by substituting s1 . . . and s4, as well as d1 . . . and d4, and then, for two-dimensional coordinates of any point, $u_s$ and $v_s$, that is, coordinates $u_d$ and $v_d$ in the affine graph, are substituted respectively.

Figure 4:
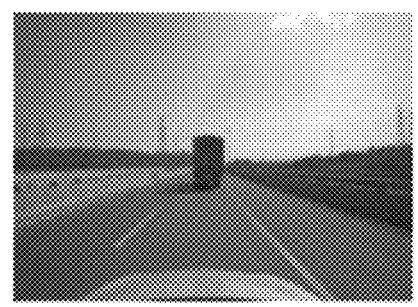
FIG. 4 is a schematic diagram of an optional original image of a lane according to an embodiment of this disclosure.
Figure 5:
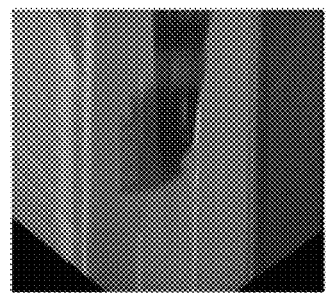
FIG. 5 is a schematic diagram of an optional affine transformation graph of a lane according to an embodiment of this disclosure
Figure 6:
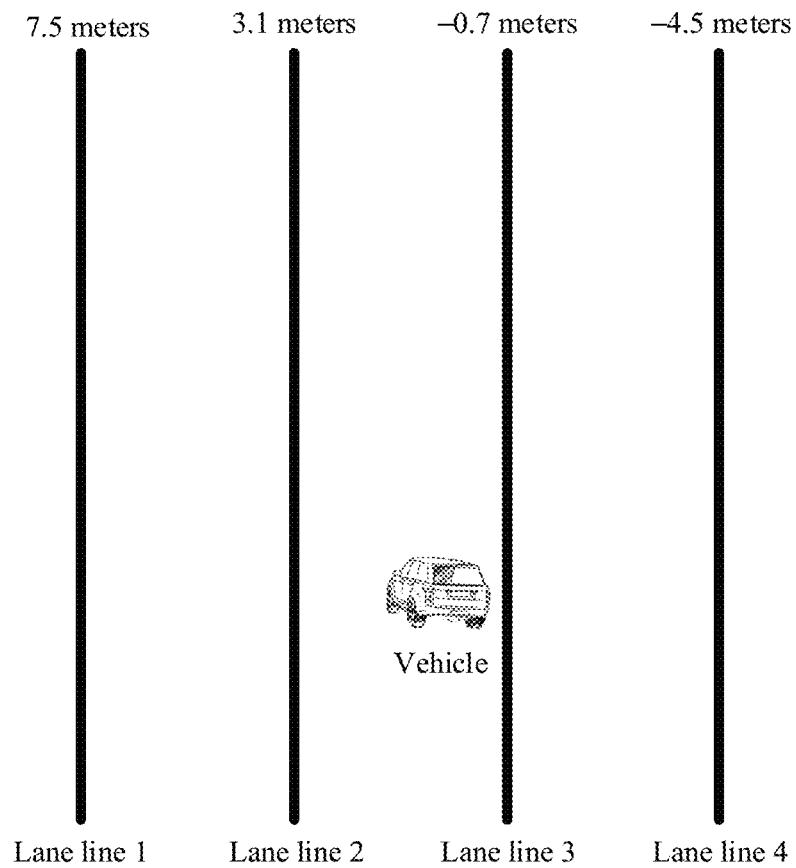
FIG. 6 is a schematic diagram of a lane in an optional map according to an embodiment of this disclosure.
Figure 8:
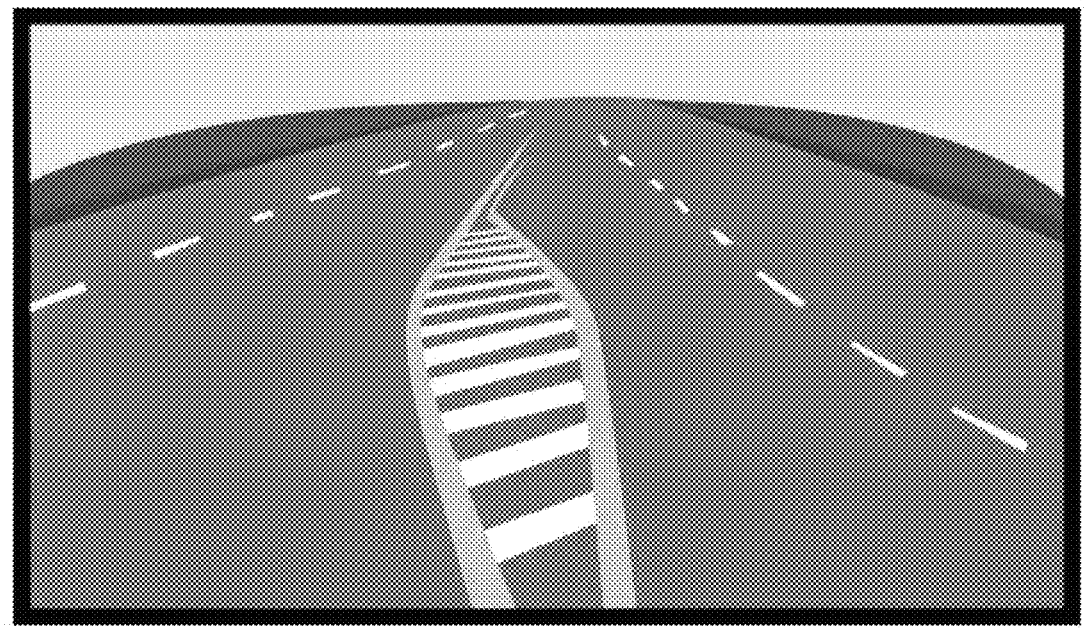
FIG. 8 is a schematic diagram of a lane in an optional map according to an embodiment of this disclosure.

Transformation is performed on pixels of the target image shown in FIG. 4 by using the affine matrix M, to obtain an affine transformation graph shown in FIG. 5, and the lane lines shown in FIG. 6 and FIG. 8 may be further determined. FIG. 6 shows a relative distance (for example, 3.1 meters) between the vehicle and the lane line.

The strapdown inertial navigation is a navigation technology in which inertial measurement elements (gyroscopes and accelerometers) are mounted directly on bodies, such as an aircraft, a naval vessel, and a vehicle, that need navigation information such as an attitude, a velocity, and a heading, and convert measured signals into navigation parameters by using a computer. The strapdown inertial navigation calculation module does not rely on external information during operation, does not radiate energy to the outside, is not easily damaged by interference, and is an autonomous navigation system. The strapdown inertial navigation calculation module performs, by using a computer, coordinate transformation on aircraft acceleration signals measured by accelerometers, and then performs navigation calculation to obtain required navigation parameters (a heading, a ground velocity, a navigation distance, a geographic location, and the like).

Step 3. Perform, according to the scale factor of the affine transformation, conversion on the relative distance of the lane line relative to the vehicle, to obtain a local lane line map of the target image at a corresponding moment. As shown in FIG. 6, the relative distance between the vehicle and the lane line may be determined.

(3) Trajectory Optimization and Map Generation of a SLAM Backend

Because precision of the frontend trajectory of the frontend odometer is reduced if the GPS signal is out of lock, but when the GPS signal is out of lock, high-precision relative pose odometer information can be obtained by filtering INS calculation and vehicle velocity data by using the EKF2, for automated mapping, detection of real-time kinematic (RTK) GPS signals is performed at intervals of a specific distance, and when the GPS signals are stable, post graph optimization is performed on the frontend odometer information in the time period. In this case, a landmark of the lane line in the local map is kept unchanged relative to the trajectory pose, and only the traveling trajectory is optimized.

Figure 7:
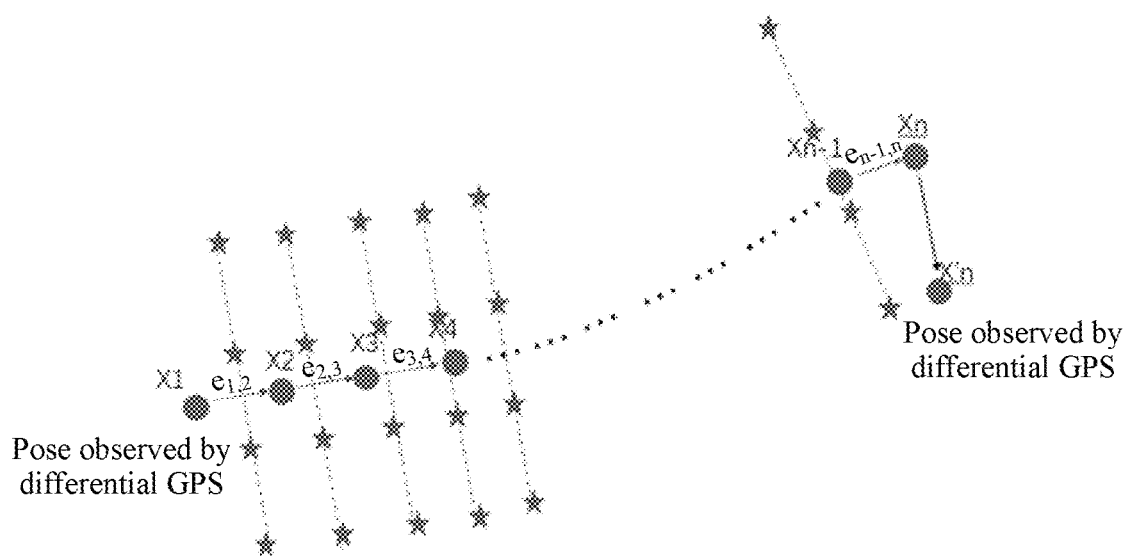
FIG. 7 is a schematic diagram of an optional local map according to an embodiment of this disclosure.

As shown in FIG. 7, a five-pointed star in the figure represents the landmark of the lane line in the local map, and a dotted line segment represents an observation edge of the landmark of the lane line. Because in the local lane line map obtained based on the foregoing steps, only a lane line distance at a lateral axis position of the vehicle is measured to obtain the landmark of the lane line, and measurement precision is high enough, the relative distance between the landmark and the vehicle pose is not optimized during the rear-end optimization, and only the vehicle trajectory is optimized.

A vertex in the pose graph is set to a pose Xi (i=1, 2, . . . , n) at each calculation moment, and an error between adjacent poses is used as an edge in the pose graph. The error exists in each relative motion. The pose graph optimizes a cumulative sum of errors among all vertices.

$$F(X) = e_{1,2}{}^T \Omega_{1,2} e_{1,2} + e_{2,3}{}^T \Omega_{2,3} e_{2,3} + + e_{3,4}{}^T \Omega_{3,4} e_{3,4} + \ldots + e_{n-1,n}{}^T \Omega_{n-1,n} e_{n-1,n}$$

In the formula, $e_{i,j}$ represents an error of an edge between vertices i and j, $\Omega_{i,j}$ represents a covariance matrix of the error of the edge between vertices i and j, and $e_{i,j}{}^T$ represents a transpose of $e_{i,j}$.

To optimize the error using g2o, edges of g2o need to be set for measurement, and a measured value is obtained from a double-EKF filtering calculation result.

In addition, a differential GPS pose of a starting point of an optimization interval needs to be used as a vertex X1, a differential GPS pose of an end point of the optimization interval needs to be used as Xn', vertices X1 and Xn' are fixed and are not optimized, and g2o performs optimization after setting a quantity of times of optimization, to obtain a finally optimized vehicle traveling trajectory in the interval.

A corresponding vehicle pose is re-obtained according to a time corresponding to the landmark of the local map and the optimized vehicle trajectory, and an actual map point of the landmark is obtained according to the relative distance between the landmark of the local map and the vehicle pose. Map points of the same lane line are connected together to obtain a final lane line map.

The technical solution of this disclosure can be used for generating a high-precision map of an autonomous traveling lane line in real time. Improving production efficiency of the high-precision map can reduce production costs of the high-precision lane line map by more than 90%.

For ease of description, the foregoing method embodiments are stated as a series of action combinations. However, a person skilled in the art needs to learn that this disclosure is not limited to the described sequence of the actions because according to this disclosure, some steps may use another sequence or may be simultaneously performed. In addition, it is to be understood by a person skilled in the art that the embodiments described in this specification are all preferred embodiments, and the actions and modules in the embodiments are not necessary for this disclosure.

According to the foregoing descriptions of implementations, a person skilled in the art may clearly learn that the method according to the foregoing embodiments may be implemented by using software and a necessary general hardware platform, or certainly may be implemented by using hardware. However, in most cases, the former is a better implementation. Based on such an understanding, the technical solutions of this disclosure essentially, or the part contributing to the related art may be embodied in the form of a software product. The computer software product is stored in a storage medium (for example, a read-only medium (ROM)/a random access memory (RAM), a magnetic disk, or an optical disc), and includes several instructions for instructing a terminal device (which may be a mobile phone, a computer, a server, or a network device) to perform the methods according to the embodiments of this disclosure.

Figure 9:
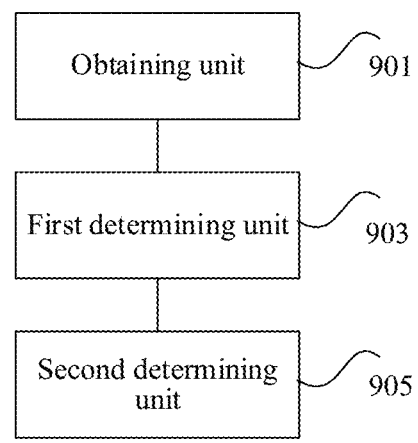
FIG. 9 is a schematic diagram of an optional lane line positioning apparatus according to an embodiment of this disclosure.

According to another aspect of the embodiments of this disclosure, a lane line positioning apparatus for implementing the foregoing lane line positioning method is further provided. FIG. 9 is a schematic diagram of an optional lane line positioning apparatus according to an embodiment of this disclosure. As shown in FIG. 9, the apparatus may include:

an obtaining module 901, configured to obtain inertial information, target traveling information, and first position information of a vehicle, the inertial information being information measured by an inertial measurement unit of the vehicle, the target traveling information being traveling information of the vehicle acquired at a first moment, and the first position information being a position of the vehicle at the first moment.

The foregoing inertial information is the information measured by the IMU of the vehicle, for example, information measured by an IMU including a three-uniaxial accelerometer and a three-uniaxial gyroscope. The information may include acceleration information of an object detected by the accelerometer in independent three axes of a vehicle coordinate system, and angular velocity information of the vehicle that is relative to a navigation coordinate system and that is detected by the gyroscope.

The foregoing target traveling information is information generated or measured during vehicle traveling, such as one or more of mileage information, velocity information, acceleration information, and positioning information. When the vehicle is in a closed or semi-closed scenario such as a bridge hole, a cave, or a parking place, the traveling information does not include positioning information such as the GPS.

The first determining unit 903 is configured to: determine second position information according to the target traveling information and the first position information, and determine third position information of the vehicle at a second moment based on the inertial information of the vehicle and the second position information, the second moment being later than the first moment.

The second determining unit 905 is configured to determine a position of a lane line in a map according to the third position information and relative position information, the relative position information being used for indicating a relative position between a detected lane line and the vehicle.

The obtaining unit 901 in this embodiment may be configured to perform step S202 in the embodiments of this disclosure, the first determining unit 903 in this embodiment may be configured to perform steps S204 and S205 in the embodiments of this disclosure, and the second determining unit 905 in this embodiment may be configured to perform step S206 in the embodiments of this disclosure.

Implemented examples and application scenarios of the foregoing modules are the same as those of the corresponding steps, but are not limited to the content disclosed in the foregoing embodiments. The foregoing modules may be run in the hardware environment shown in FIG. 1 as a part of the apparatus, and may be implemented by software, or may be implemented by hardware.

Through the foregoing modules, the inertial information, the target traveling information, and the first position information of the vehicle are obtained. The inertial information is the information measured by the inertial measurement unit of the vehicle, the target traveling information is the traveling information of the vehicle acquired at the first moment, and the first position information may include the position of the vehicle at the first moment. The second position information is determined according to the target traveling information and the first position information, and the third position information of the vehicle at a second moment is determined based on the inertial information of the vehicle and the second position information. The second moment is later than the first moment. The position of the lane line in the map is determined according to the third position information and the relative position information. The relative position information is used for indicating the relative position between the lane line detected by the vehicle and the vehicle. Because the inertial information does not rely on a GPS signal, even in a case that there is no GPS signal, the third position information of the vehicle at a later moment (that is, the second moment) may be determined by using the second position information and the inertial information of the vehicle, and then the position of the lane line in the map is determined according to the third position information and the relative position between the lane line and the vehicle, to resolve the technical problem in the related art that the position of the lane line in the map cannot be accurately determined, and further achieve a technical effect of accurately positioning the lane line.

In an optional embodiment, the foregoing first determining unit may be configured to: correct the first position information by using the target traveling information, to obtain the second position information, and determine the third position information of the vehicle at the second moment based on the inertial information of the vehicle and the second position information.

In an optional embodiment, the foregoing first obtaining module may obtain: an obtaining module, configured to obtain a first information change value between first traveling information and the target traveling information, the first traveling information being determined according to inertial information of the vehicle at the first moment, and the first information change value being a traveling information change value of the vehicle at the first moment; and a determining module, configured to: correct the first position information according to the first information change value, to obtain the second position information, and determine the third position information by using the second position information and the inertial information of the vehicle at the second moment.

Optionally, in a case that the inertial information of the vehicle at the second moment includes multiaxial angular velocities at the second moment and multiaxial accelerations at the second moment, and the first information change value includes a velocity change value at the first moment and a position change value at the first moment, the foregoing determining module may include: an input submodule, configured to use the multiaxial angular velocities of the vehicle at the second moment, the multiaxial accelerations at the second moment, and the first information change value as inputs of a strapdown inertial navigation calculation module, the strapdown inertial navigation calculation module being configured to: correct the first position information by using the position change value at the first moment, to obtain the second position information, correct a velocity at the first moment by using the velocity change value at the first moment, determine an acceleration of the vehicle at the second moment by using the multiaxial angular velocities at the second moment and the multiaxial accelerations at the second moment, and determine the third position information by using the acceleration of the vehicle at the second moment, the second position information, and the corrected velocity at the first moment; and a first obtaining submodule, configured to obtain the third position information of the vehicle at the second moment outputted by the strapdown inertial navigation calculation module.

The foregoing obtaining module may include: a second obtaining submodule, configured to: obtain the first traveling information outputted by the strapdown inertial navigation calculation module, according to the inertial information of the vehicle at the first moment and a second information change value, and obtain the target traveling information, the first traveling information including a first velocity, an acceleration, and the first position information of the vehicle at the first moment outputted by the strapdown inertial navigation calculation module, and the second information change value being a traveling information change value of the vehicle at a third moment, the third moment being earlier than the first moment; and a third obtaining submodule, configured to obtain a velocity change value between the first velocity in the first traveling information at the first moment and a second velocity in the target traveling information, and a position change value between a position in the first traveling information and a position in the first position information in a case that the vehicle is not communicably connected to a positioning system, the first information change value including a velocity change value at the first moment and a position change value at the first moment.

Optionally, the second obtaining submodule is further configured to: obtain a second velocity and the position of the vehicle at the first moment that are determined by an odometer of the vehicle.

Optionally, before the obtaining the first driving information outputted by the strapdown inertial navigation calculation module according to the inertial information of the vehicle at the first moment and a second information change value, the second obtaining submodule may be further configured to obtain the second information change value. The second information change value includes a velocity change value of the vehicle at the third moment determined by using a first filter and a position change value and an acceleration change value of the vehicle at the third moment that are determined by using a second filter.

In still another optional embodiment, the second determining unit may include: a recognition module, configured to recognize a lane line from a target image acquired by an image acquisition apparatus of the vehicle; a relationship obtaining module, configured to obtain relative position information between the lane line and the vehicle; and a search module, configured to search for fourth position information to which the third position information is mapped in the map, determine a fifth position information in the map according to the fourth position information and the relative position information, and create the lane line at the fifth position information.

Optionally, when recognizing the lane line from the target image acquired by the image acquisition apparatus of the vehicle, the recognition module may perform affine transformation on the target image by using an affine transformation matrix, to obtain an affine transformation graph of the target image, and use a parallel line in the affine transformation graph as the lane line.

Optionally, if the relative position information includes a relative distance between the lane line and the vehicle, when obtaining the relative position between the lane line and the vehicle, the relationship obtaining module may obtain a pixel distance between the lane line and the vehicle in the affine transformation graph, and determine the relative distance between the lane line and the vehicle by using a product of a scale factor of the affine transformation and the pixel distance.

In this solution of this applicant, the SLAM frontend filters data of the low-cost MEMS IMU, wheel speed data, and RTK GPS data by using double EKFs, to correct strapdown calculation errors of the IMU. Because the strapdown calculation is an autonomous calculation, and is subjected to extremely small impact of an external environment because the wheel speed data is data of the vehicle, stable frontend odometer estimation can be implemented. In addition, for extraction of a local lane line map on the frontend, stable local map information can be obtained through lane line detection, affine transformation, calibration, and the like, and there is extremely small external interference.

In addition, during backend processing, the RTK GPS data is used for loop-back detection, to, on the one hand, ensure loop-back precision, and on the other hand, ensure stability. Therefore, this solution has advantages of low costs, high precision, and automated on-line mapping of a high-precision lane line map.

Implemented examples and application scenarios of the foregoing modules are the same as those of the corresponding steps, but are not limited to the content disclosed in the foregoing embodiments. The foregoing modules may be run in the hardware environment shown in FIG. 1 as a part of the apparatus, and may be implemented by software, or may be implemented by hardware. The hardware environment includes a network environment.

According to another aspect of the embodiments of this disclosure, a server or a terminal configured to implement the foregoing lane line positioning method is further provided.

Figure 10:
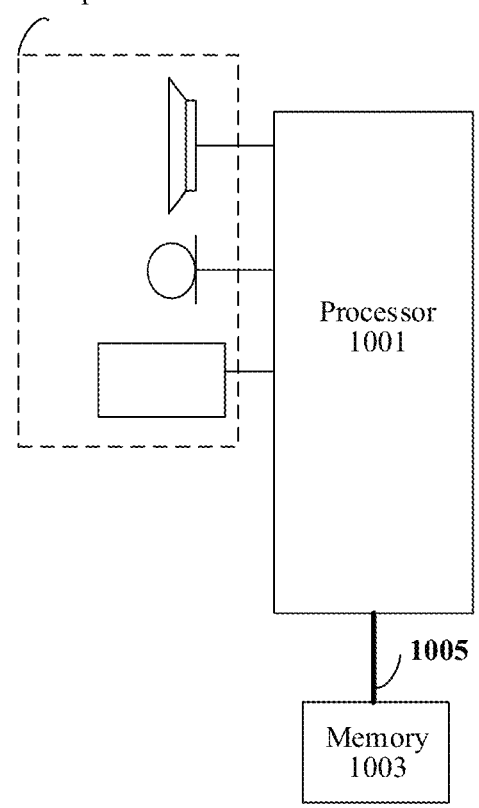
FIG. 10 is a structural block diagram of a terminal according to an embodiment of this disclosure.

FIG. 10 is a structural block diagram of a terminal according to an embodiment of this disclosure. As shown in FIG. 10, the terminal may include one or more processors 1001 (only one processor is shown in the figure), a memory 1003, and a transmission apparatus 1005. As shown in FIG. 10, the terminal may further include an input/output device 1007.

The memory 1003 may be configured to store a software program and a module, for example, a program instruction/module corresponding to the lane line positioning method and apparatus in the embodiments of this disclosure, and the processor 1001 performs various functional applications and data processing by running the software program and the module stored in the memory 1003, that is, implementing the foregoing lane line positioning method. The memory 1003 may include a high-speed random memory, and may also include a non-volatile memory, for example, one or more magnetic storage apparatuses, a flash memory, or another nonvolatile solid-state memory. In some embodiments, the memory 1003 may further include memories remotely disposed relative to the processor 1001, and the remote memories can be connected to the terminal through a network. Examples of the foregoing network include, but are not limited to, the Internet, an intranet, a local area network, a mobile communications network, and a combination thereof.

The transmission apparatus 1005 is configured to receive or send data by means of a network, or may further be configured to transmit data between the processor and the memory. A specific example of the foregoing network may include a wired network and a wireless network. In an example, the transmission apparatus 1005 includes a network interface controller (NIC). The NIC may be connected to another network device and a router by using a network cable, to communicate with the Internet or the local network. In an example, the transmission apparatus 1005 is a radio frequency (RF) module, which communicates with the Internet in a wireless manner.

Specifically, the memory 1003 is configured to store an application.

The processor 1001 may invoke, by using the transmission apparatus 1005, the application stored in the memory 1003, to perform the following steps:

obtaining inertial information, target traveling information, and first position information of a vehicle, the inertial information being information measured by an inertial measurement unit of the vehicle, the target traveling information being traveling information of the vehicle acquired at a first moment, and the first position information being a position of the vehicle at the first moment;

determining second position information according to the target traveling information and the first position information, and determining third position information of the vehicle at a second moment based on the inertial information of the vehicle and the second position information, the second moment being later than the first moment; and determining a position of a lane line in a map according to the third position information and relative position information, the relative position information being used for indicating a relative position between a detected lane line and the vehicle.

Optionally, for a specific example in this embodiment, refer to the examples described in the foregoing embodiment. Details are not described herein again in this embodiment.

A person of ordinary skill in the art may understand that the structure shown in FIG. 10 is merely an example, and the terminal may be a terminal device such as a smartphone (for example, an Android mobile phone or an iOS mobile phone), a tablet computer, a palmtop computer, a mobile Internet device (MID), or a PAD. FIG. 10 does not constitute a limitation on a structure of the foregoing electronic device. For example, the terminal may alternatively include more or fewer components (such as a network interface and a display apparatus) than those shown in FIG. 10, or may have a configuration different from that shown in FIG. 10.

A person of ordinary skill in the art may understand that all or some of the steps of the methods in the foregoing embodiments may be implemented by a program instructing relevant hardware of the terminal device. The program may be stored in a computer-readable storage medium. The storage medium may include a flash disk, a ROM, a RAM, a magnetic disk, an optical disc, and the like.

An embodiment of this disclosure further provides a storage medium. Optionally, in this embodiment, the storage medium may be configured to store program code for performing the lane line positioning method.

Optionally, in this embodiment, the storage medium may be located on at least one of a plurality of network devices in the network described in the foregoing embodiment.

Optionally, for a specific example in this embodiment, refer to the examples described in the foregoing embodiment. Details are not described herein again in this embodiment.

Optionally, in this embodiment, the storage medium may include, but is not limited to, various media such as a USB flash drive, a ROM, a RAM, a removable hard disk, a magnetic disk, and an optical disc that can store the program code.

The sequence numbers of the foregoing embodiments of this disclosure are merely for description purpose and do not indicate the preference of the embodiments.

When the integrated unit in the foregoing embodiments is implemented in the form of a software functional unit and sold or used as an independent product, the integrated unit may be stored in the foregoing computer-readable storage medium. Based on such an understanding, the technical solution of this disclosure essentially, or a part contributing to the related art, or all or a part of the technical solution may be implemented in a form of a software product. The computer software product is stored in a storage medium and includes several instructions for instructing one or more computer devices (which may be a personal computer, a server, a network device, or the like) to perform all or some of steps of the methods in the embodiments of this disclosure.

In the foregoing embodiments of this disclosure, descriptions of the embodiments have different emphases. As for parts that are not described in detail in one embodiment, reference can be made to the relevant descriptions of the other embodiments.

In the several embodiments provided in this disclosure, it is to be understood that the disclosed client can be implemented in other manners. The apparatus embodiments described above are merely exemplary. For example, the division of the units is merely the division of logic functions, and can use other division manners during actual implementation. For example, a plurality of units or components can be combined, or can be integrated into another system, or some features can be omitted or not performed. In addition, the coupling, or direct coupling, or communication connection between the displayed or discussed components can be the indirect coupling or communication connection through some interfaces, units, or modules, and can be in electrical or other forms.

The units described as separate parts can or cannot be physically separate. Parts displayed as units can or cannot be physical units, and can be located in one position, or can be distributed on a plurality of network units. Some or all of the units can be selected according to actual requirements to achieve the objectives of the solutions in the embodiments.

In addition, functional units in the embodiments of this disclosure can be integrated into one processing unit, or each of the units can exist alone physically, or two or more units are integrated into one unit. The foregoing integrated unit can be implemented in the form of hardware, or can be implemented in the form of a software function unit.

The foregoing descriptions are merely exemplary implementations of this disclosure. A person of ordinary skill in the art can further make several improvements and refinements without departing from the principle of this disclosure, and the improvements and refinements shall fall within the protection scope of this disclosure.

What is claimed is:

1. A method for positioning a lane line, comprising:
obtaining inertial information, target traveling information, and first position information of a vehicle, the -inertial information comprising information measured by an inertial measurement unit of the vehicle, the target traveling information comprising traveling information of the vehicle acquired at a first moment, and the first position information comprising a position of the vehicle at the first moment;
determining second position information according to the target traveling information and the first position information;
determining third position information of the vehicle based on the inertial information of the vehicle and the second position information, the third position information comprising a position of the vehicle at a second moment, the second moment being later than the first moment;
determining a position of a lane line in a map according to the third position information and distance information indicating a relative position between a detected lane line and the vehicle;
generating a traveling trajectory of the vehicle by means of a first filter associated with an odometer; and
optimizing the traveling trajectory by means of a second filter associated with a positioning system, the second filter being different from the first filter.

2. The method of claim 1, wherein the determining the second position information according to the target traveling information and the first position information comprises:
correcting the first position information based on the target traveling information; and
determining the corrected first position information as, the second position information.

3. The method of claim 2, wherein the correcting the first position information comprises:
calculating first traveling information of the vehicle based on the inertial information of the vehicle;
obtaining a first information change value between the first traveling information and the target traveling information, and the first information change value being a traveling information change value of the vehicle at the first moment; and
correcting the first position information based on the first information change value.

4. The method of claim 3, wherein the inertial information of the vehicle at the second moment comprises multiaxial angular velocities at the second moment and multiaxial accelerations at the second moment, and the first information change value comprises a velocity change value at the first moment and a position change value at the first moment, the correcting the first position information according to the first information change value comprises:
correcting the first position information using the position change value at the first moment, to obtain the second position information; and
the determining the third position information of the vehicle at the second moment comprises:
correcting a velocity of the vehicle at the first moment using the velocity change value at the first moment;
determining an acceleration of the vehicle at the second moment using the multiaxial angular velocities at the second moment and the multiaxial accelerations at the second moment; and
determining the third position information using the acceleration of the vehicle at the second moment, the second position information, and the corrected velocity at the first moment.

5. The method of claim 4, wherein the third position information of the vehicle at the second moment is determined by a strapdown inertial navigation calculation module, the method further comprises:
obtaining the third position information of the vehicle at the second moment outputted by the strapdown inertial navigation calculation module.

6. The method of claim 3, wherein the determining the first traveling information comprises:
determining the first traveling information based on the inertial information of the vehicle at the first moment and a second information change value, the first traveling information comprising a first velocity at the first moment, an acceleration at the first moment, and the first position information of the vehicle at the first moment, the second information change value comprising a traveling information change value of the vehicle at a third moment, the third moment being earlier than the first moment.

7. The method of claim 6, wherein the method further comprises:
obtaining a velocity change value at the first moment between the first velocity in the first traveling information and a second velocity in the target traveling information, and a position change value at the first moment between a position in the first traveling information and a position in the first position information, the first information change value comprising the velocity change value at the first moment and the position change value at the first moment.

8. The method of claim 6, wherein the method further comprises:
obtaining a second velocity at the first moment and the position of the vehicle at the first moment that are determined by an odometer of the vehicle.

9. The method of claim 6, wherein before the determining the first traveling information based on the inertial information of the vehicle at the first moment and the second information change value, the method further comprises:
obtaining the second information change value, the second information change value comprising a velocity change value of the vehicle at the third moment determined by a first filter and a position change value and an acceleration change value of the vehicle at the third moment that are determined by a second filter.

10. The method of claim 1, wherein the determining the position of the lane line in the map according to the third position information and the distance information comprises:
recognizing the lane line from a target image acquired by an image acquisition apparatus of the vehicle;
obtaining distance information between the lane line and the vehicle;
searching for fourth position information to which the third position information is mapped in the map;
determining a fifth position information in the map according to the fourth position information and the distance information; and
creating a lane line based on the fifth position information.

11. The method of claim 10, wherein the recognizing the lane line from a target image comprises:
performing affine transformation on the target image using an affine transformation matrix, to obtain an affine transformation graph of the target image; and
using a parallel line in the affine transformation graph as the lane line.

12. The method of claim 11, wherein the distance information comprising a relative distance between the lane line and the vehicle, the obtaining the distance information between the lane line and the vehicle comprises:
obtaining a pixel distance between the lane line and the vehicle in the affine transformation graph; and
determining the relative distance between the lane line and the vehicle using a product of a scale factor of the affine transformation and the pixel distance.

13. An apparatus for positioning a lane line, comprising:
a memory operable to store program code; and
a processor operable to read the program code and configured to:
obtain inertial information, target traveling information, and first position information of a vehicle, the inertial information comprising information measured by an inertial measurement unit of the vehicle, the target traveling information comprising traveling information of the vehicle acquired at a first moment, and the first position information comprising a position of the vehicle at the first moment;
determine second position information according to the target traveling information and the first position information;
determine third position information of the vehicle based on the inertial information of the vehicle and the second position information, the third position information comprising a position of the vehicle at a second moment, the second moment being later than the first moment;
determine a position of a lane line in a map according to the third position information and distance information, the distance information indicating a relative position between a detected lane line and the vehicle;
generate a traveling trajectory of the vehicle by means of a first filter associated with an odometer; and
optimize the traveling trajectory by means of a second filter associated with a positioning system, the second filter being different from the first filter.

14. The apparatus of claim 13, wherein the processor is configured to:
correct the first position information based on the target traveling information; and
determining the corrected first position information as, the second position information.

15. The apparatus of claim 14, wherein the processor is configured to:
calculating first traveling information of the vehicle based on inertial information of the vehicle;
obtaining a first information change value between the first traveling information and the target traveling information, and the first information change value being a traveling information change value of the vehicle at the first moment; and
correcting the first position information based on the first information change value.

16. The apparatus of claim 15, wherein the inertial information of the vehicle at the second moment comprises multiaxial angular velocities at the second moment and multiaxial accelerations at the second moment, and the first information change value comprises a velocity change value at the first moment and a position change value at the first moment, the processor is configured to:
correct the first position information using the position change value at the first moment, to obtain the second position information;
correct a velocity of the vehicle at the first moment using the velocity change value at the first moment;
determine an acceleration of the vehicle at the second moment using the multiaxial angular velocities at the second moment and the multiaxial accelerations at the second moment; and
determine the third position information using the acceleration of the vehicle at the second moment, the second position information, and the corrected velocity at the first moment.

17. The apparatus of claim 15, wherein the processor is configured to:
determine the first traveling information based on the inertial information of the vehicle at the first moment and a second information change value, the first traveling information comprising a first velocity at the first moment, an acceleration at the first moment, and the first position information of the vehicle at the first moment, the second information change value comprising a traveling information change value of the vehicle at a third moment, the third moment being earlier than the first moment.

18. The apparatus of claim 17, wherein the processor is further configured to:

obtain a velocity change value at the first moment between the first velocity in the first traveling information and a second velocity in the target traveling information, and a position change value at the first moment between a position in the first traveling information and a position in the first position information, the first information change value comprising the velocity change value at the first moment and the position change value at the first moment.

19. The apparatus of claim 13, wherein the processor is further configured to:

recognize the lane line from a target image acquired by an image acquisition apparatus of the vehicle;

obtain distance information between the lane line and the vehicle;

search for fourth position information to which the third position information is mapped in the map;

determine a fifth position information in the map according to the fourth position information and the distance information; and create a lane line based on the fifth position information.

20. A non-transitory machine-readable storage medium, having processor executable instructions stored thereon for causing a processor to:

obtain inertial information, target traveling information, and first position information of a vehicle, the inertial information comprising information measured by an inertial measurement unit of the vehicle, the target traveling information comprising traveling information of the vehicle acquired at a first moment, and the first position information comprising a position of the vehicle at the first moment;

determine second position information according to the target traveling information and the first position information;

determine third position information of the vehicle based on the inertial information of the vehicle and the second position information, the third position information comprising a position of the vehicle at a second moment, the second moment being later than the first moment;

determine a position of a lane line in a map according to the third position information and distance information, the distance information indicating a relative position between a detected lane line and the vehicle;

generate a traveling trajectory of the vehicle by means of a first filter associated with an odometer; and optimize the traveling trajectory by means of a second filter associated with a positioning system, the second filter being different from the first filter.

* * * * *